Nov. 14, 1939.  M. P. SPARTALIS  2,179,646

BARBECUE MACHINE

Original Filed May 4, 1935   4 Sheets—Sheet 1

INVENTOR
Michael P. Spartalis
BY
Stryker & Stryker
ATTORNEYS

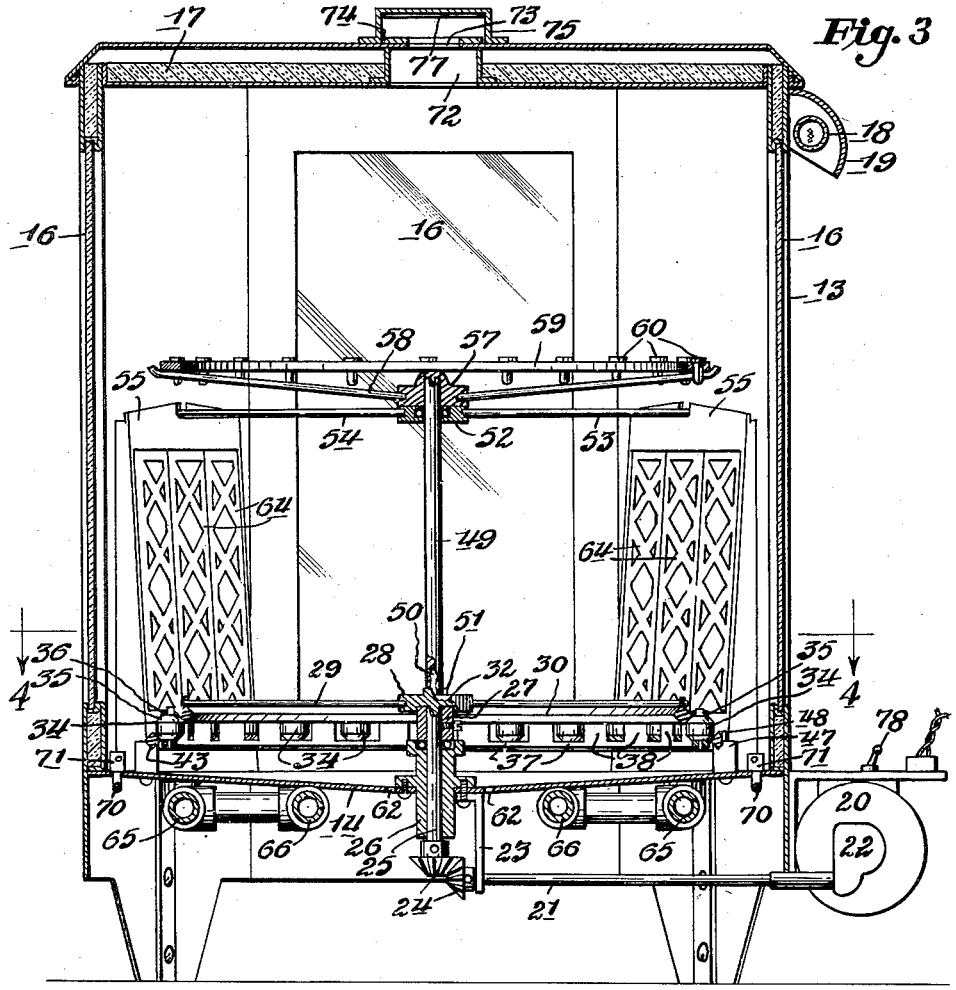
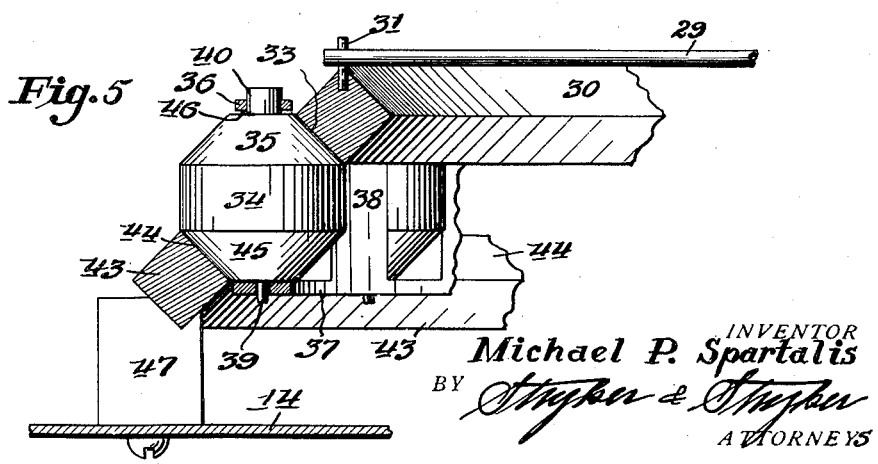

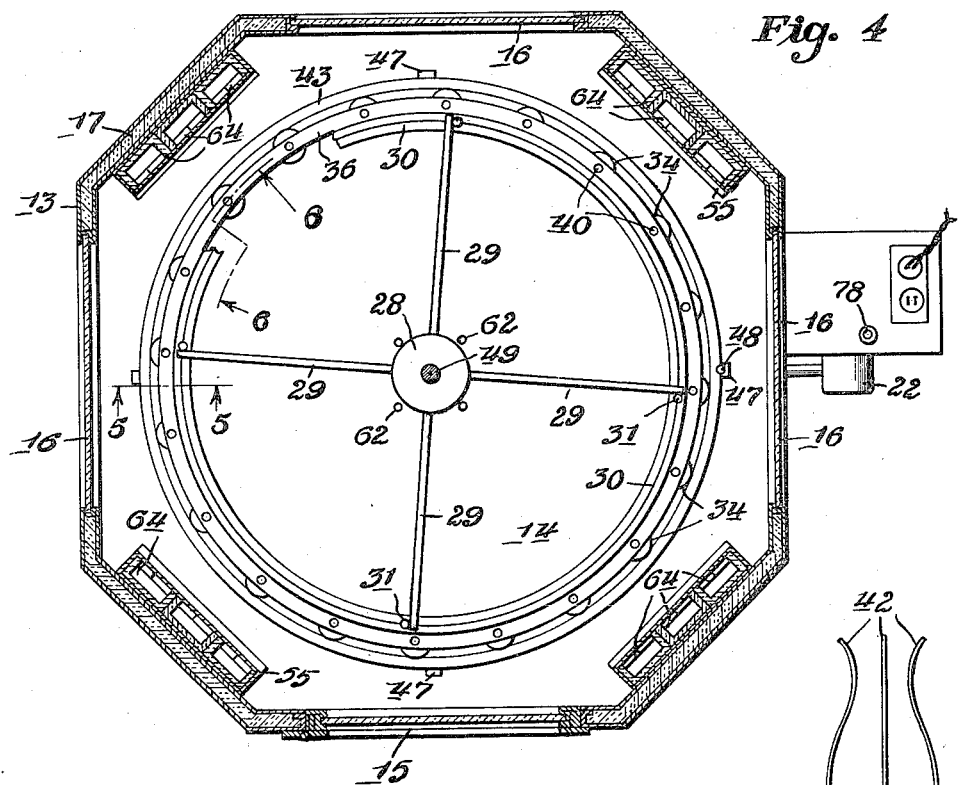
Fig. 4
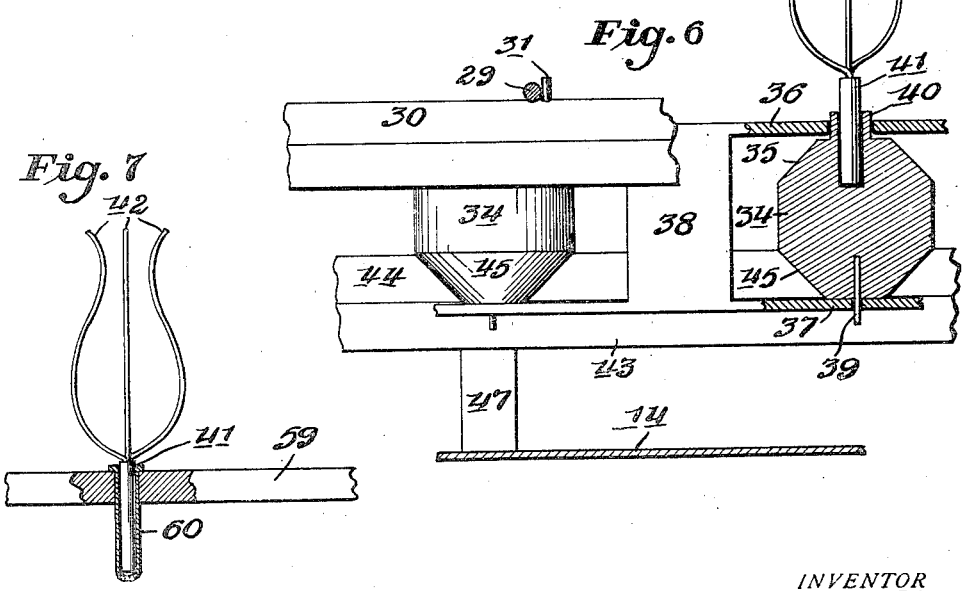
Fig. 6
Fig. 7
INVENTOR
Michael P. Spartalis
BY Stryker & Stryker
ATTORNEYS Nov. 14, 1939.  M. P. SPARTALIS  2,179,646
BARBECUE MACHINE
Original Filed May 4, 1935  4 Sheets-Sheet 4

INVENTOR
Michael P. Spartalis
BY Stryker & Stryker
ATTORNEYS

Patented Nov. 14, 1939

2,179,646

UNITED STATES PATENT OFFICE 2,179,646

BARBECUE MACHINE

Michael P. Spartalis, St. Paul, Minn., assignor of twenty per cent to Nick Chiomes and twenty per cent to J. P. J. Dolan, both of St. Paul, Minn., and twenty per cent to Constantine M. Rallis, of Minneapolis, Minn., and forty per cent to Athena M. Spartalis Application May 4, 1935, Serial No. 19,829
Renewed October 13, 1938

13 Claims. (Cl. 126—41)

It is an object of this invention to provide, particularly, although not exclusively, for restaurants and other public eating places, a novel machine wherein meats and other foods may be broiled or barbecued while being displayed in an attractive manner.

Another object is to provide a novel broiler having an improved arrangement of heating units and conveyors for individual portions of food.

A further object is to provide in a broiler chamber a multiplicity of holders for food and simple and efficient mechanism for turning such holders in the heat zone in such manner that thorough and uniform broiling of the food is insured while a minimum of attention to the machine is required.

A particular object is to provide a cooking chamber with a novel arrangement of heating units and food conveying mechanism whereby the food may be given preliminary heat treatment as well as the searing or broiling treatment, and the mechanism is adapted for the preparation of certain Asiatic dishes known as "revettes."

Other objects are to provide food conveying mechanism which is readily removable from the cooking chamber for cleaning and is so constructed that the drippings from the food do not interfere with efficient operation.

In its preferred embodiments herein described, the improved barbecuing or broiling machine incorporates an annular rotary conveyer which carries a circumferentially spaced series of outer food holders that are individually mounted for rotary movement on axes parallel to the axis of the rotary conveyor. A central food holder or supporting element extends axially of the conveyer into or through the plane of food carried by the several carriers of the annular series thereof. This central food supporting element, in one of its two forms illustrated, is in the nature of a stem-like skewer that is adapted to have a roast or the like impaled thereon to be supported thereby in the plane of such, usually small, food articles as may be individually carried by the holders of the series. In this embodiment of the invention, the space between the annular series of food holders and the center holders is open or unobstructed, and a plurality of heating elements are circumferentially spaced radially outward of the circular space defined by the annular series of food holders and are arranged to direct their heat rays toward the center food holder and in the plane of food carried thereby and the series of holders.

A particular object of the instant invention is the uniform subjection, in an arrangement of the kind just described, of all portions of each of the several food articles carried by the several holders of the annular series and all portions of the article or articles carried by the center food holder, to direct radiation of the heating means. In an arrangement of this kind the accomplishment of this objection, insofar as food articles carried by the annular series of holders is concerned, is fully and readily obtained by rotating the rotary conveyer on its own axis so as to bring the said annular series of holders thereof successively passed the heating means while at the same time individually rotating the several holders of the series on their own axes, but to accomplish the stated objective with respect to food carried by the center holder or support, it is necessary not only to rotate the center food holder or support with respect to the heating means but it is further necessary to provide a relative rotation therebetween and the annular conveyer. This relative rotation is necessary by reason of the fact that the carriers of the annular series and food carried thereby intercept some of the heat rays directed toward the the center food holder and cast heat ray shadows on the food articles carried by the center food holder; whereas, some of the heat rays pass between the food holders of the annular series directly to the centrally located food. Of course, these shadows would tend to cause uneven treatment of the food on the center food holder if they were permitted to remain stationary with respect thereto, but in the preferred embodiment illustrated and above described, the adverse effects of these shadows are overcome by the relative rotation described, and which relative rotation is the result of rotating the conveyer and central food holder in the same direction but at different speeds through a novel drive mechanism including planetary transmission elements.

Referring to the accompanying drawings which illustrate the preferred form of my machine:

Fig. 3 is a central vertical section through the machine with the upper ring in place;

Fig. 4 is a horizontal section taken on the line 4—4 of Fig. 3;

Fig. 5 is a fragmentary section on an enlarged scale, taken on the line 5—5 of Fig. 4;

Fig. 6 is a part side elevation and part section taken on the line 6—6 of Fig. 4;

Fig. 7 is a part section and part side elevation showing one of the food holders on the upper ring;

Figure 2:
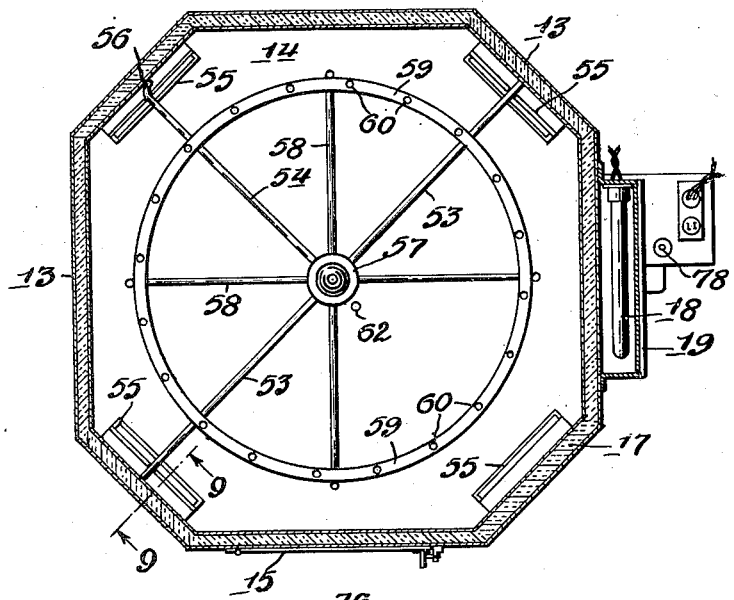
Fig. 2 is a horizontal section taken on the line 2—2 of Fig. 1, with the upper conveying ring in place on the spindle.

The machine has an oven or heat chamber provided with a top 12, side walls 13 and bottom 14. The chamber is preferably eight-sided, as indicated in Figs. 2 and 4 and at one side a door 15 is provided to allow access to the interior. This door is glazed to afford a view of the interior and three of the other sides have large windows 16 mounted therein to allow the contents to be viewed for display and vending purposes. The walls 13 and top 12 contain heat insulating material 17 preferably enclosed within metal inner and outer casings, as illustrated. The top 12 is similarly insulated and is preferably made removable as indicated in Fig. 3. The interior of the machine is illuminated by a lamp 18, Figs. 2 and 3, provided with a reflector 19.

An electric motor 20 is mounted on one side of the machine and is arranged to drive a horizontal shaft 21 through speed reducing gears in a casing 22 mounted on the end of the motor. As shown in Fig. 3, the shaft 21 is supported on a bracket 23 depending from the bottom 14. Operatively connected to the shaft 21 by bevel gears 24 is a vertical shaft 25 mounted in a bearing 26 located centrally in the bottom 14. A collar 27 is fixed on the upper end of the shaft 24 and removably keyed to this collar is a head 28 provided with arms 29 for propelling a ring 30. Pins 31 project from the top of the ring 30 to be engaged by the arms 29. Each of these arms 29 together with the head 28 constitutes a driving element that spans the radial space between the power driven shaft and the conveyor ring and is rotatively anchored to said shaft and conveyer. The head 28 has a central recess to receive the collar 27 and a laterally extending lug 32 is formed on the bottom of the head to engage in a keyway or cross slot in the upper face of the collar.

As shown in Figs. 3 and 5, the ring 30 has a conical lower and outer surface 33 which rests upon a multiplicity of rollers 34 formed with upper conical portions 35 to fit the surface 33. The rollers 34 are mounted at regular spaced intervals on a conveyor ring formed with upper and lower horizontal flanges 36 and 37 respectively between which the rollers 34 are mounted. Web portions 38 of the conveyor ring connect the flanges 36 and 37 together. Secured axially in each roller 34 is a pin 39 revolubly fitting in a bearing in the flange 37. At its upper end each roller is formed with an axial socket 40 fitting in a bearing in the flange 36. As best shown in Fig. 6, the sockets 40 are formed to receive holders 41 for individual portions of food. The holders illustrated have spring prongs 42 to embrace, grip or be thrust into the portion of meat or other food to be cooked. Ordinary skewers or other suitable holders may be substituted for those illustrated.

Mounted concentrically to the ring 30 and circular conveyor is a circular track 43 adapted to continuously support all of the rollers 34. The inner and upper surface 44 of the track 43 is conical to conform to conical surfaces 45 formed on the rollers 34. To insure frictional engagement of all of the rollers 34 with the track 43, limited axial movement of the individual rollers on their supports is permitted, as indicated by the ample space 46 (Figs. 5 and 6) between the rollers and the upper flange 36. The circular track 43 is removably supported on blocks 47, one of which has a pin 48 (Figs. 3 and 4) projecting therefrom to engage in a recess in the track. The blocks 47 are secured to the bottom 14.

A shaft 49 is arranged to be mounted centrally in the heating chamber, in continuation of the shaft 25. The lower end of the shaft 49 rests on the head 28 and is centered thereon by a stud 50 projecting axially from said head into a socket in the lower end of the shaft. A laterally extending lug 51 fits in a groove in the shaft 49 to establish the driving connection. The upper end of the shaft 49 has an anti-friction bearing in a bracket 52 supported by arms 53 and 54 extending to the side walls of the chamber. These arms are supported in recesses in the upper ends of metal casings 55 for the heating units hereinafter described. As shown in Fig. 2, the arm 54 has a laterally bent end 56 to engage the casing 55 so that no arm is required at the opposite side of the bracket 52 where a clear space is required to facilitate removal of the mechanism from the chamber. Removably secured to the upper end of the shaft 49 is a head 57 having radially projecting arms 58 for supporting an upper conveyor ring 59. The outer ends of the arms 58 are bent upward to confine the ring 59 concentrically to the shaft 49. Mounted on the ring 59 are a multiplicity of sockets 60 for food holders, such, for example, as the holders 41 shown in Fig. 7.

Figure 1:
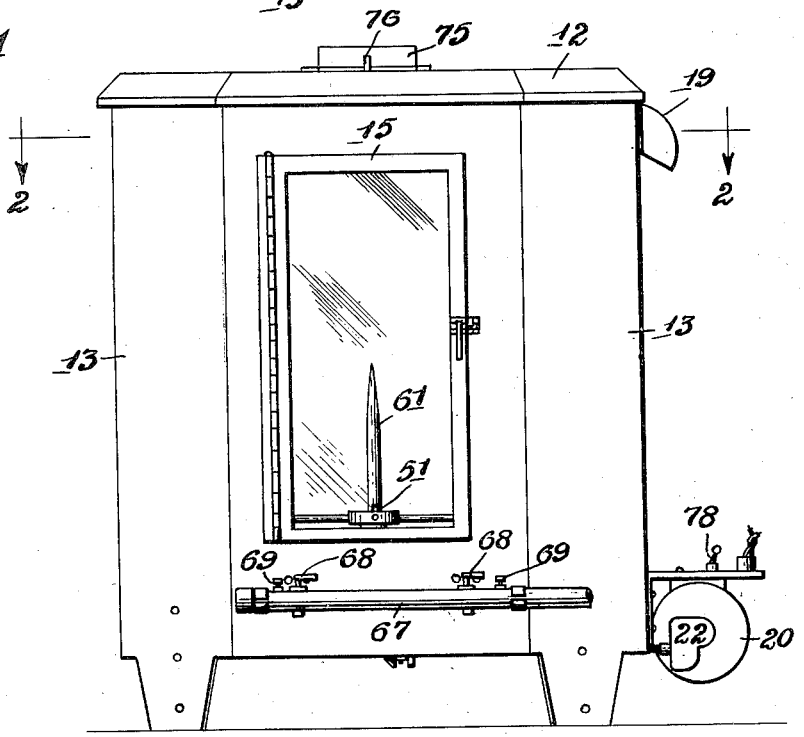
Figure 1 is a front elevation.

The upper conveying ring 59 may be removed by merely lifting it together with the head 57 and arms 58 from the upper end of the shaft 49, then tilting the parts into the space afforded obliquely to the front of the arms 53 (Fig. 2) and withdrawing them through the opening for the door 15. The bearing bracket 52 is also readily removable, together with the shaft 49, from the heating chamber. When it is desired to broil large portions of food or a roast, a large skewer 61 (Fig. 1) is substituted for the shaft 49 on the head 28. The lower end of the skewer 61 is formed to receive the stud 50 and to be engaged by the cross lug 51 for rotating the food held by the skewer. The juices from the roast and individual portions of food are collected on the bottom 14 which is dish-shaped and provided with drainage openings 62. A receptacle (not shown) is placed beneath the machine to catch the juices escaping through the openings 62.

Figure 8:
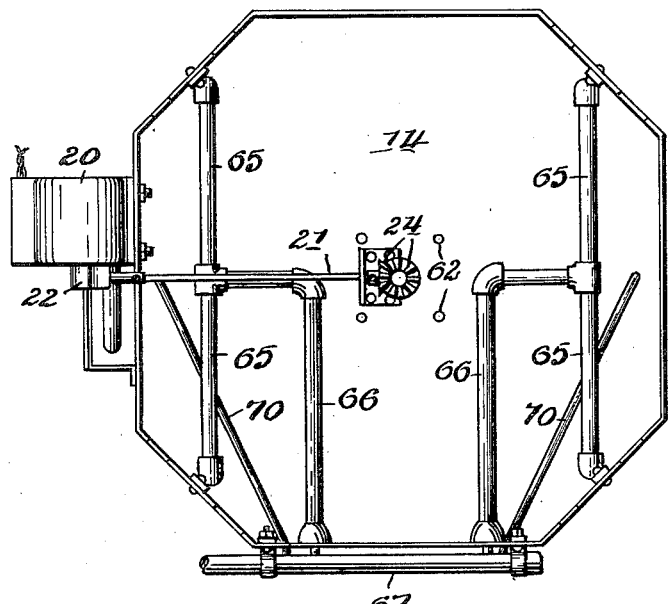
Fig. 8 is a bottom plan view of the machine.
Figure 9:
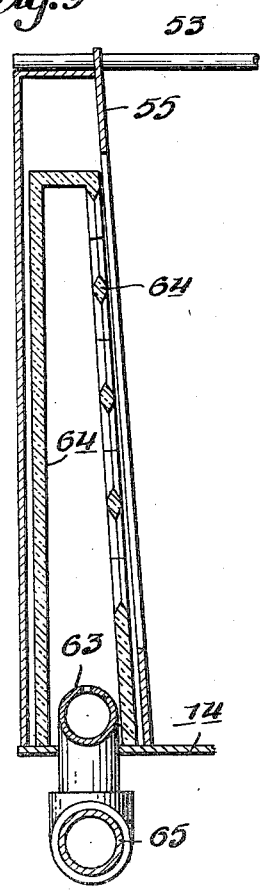
Fig. 9 is a vertical section through one of the heating units.

Four burners or heating units are disposed symmetrically on the walls of the cooking chamber. The heating units are confined in the casings 55 and comprise gas burners 63 adapted to heat refractory material 64 having open grill formations at the front from which the heat passes into the cooking chamber. This refractory material is preferably made in sections, as indicated in Figs. 3 and 4, and is removable from the front or inner side of the casings 55. As shown in the bottom view, Fig. 8, the burners 63 are supplied with gas through branches 65 of pipes 66. The latter pipes are, in turn, supplied through control cocks 68 on a main gas pipe 67. To facilitate ignition of the main gas burners, automatic lighter cocks 69 are provided on the pipe 67 to control the supply of gas through pipes 70 extending to lighter burners 71 (Figs. 3 and 8).

Figure 10:
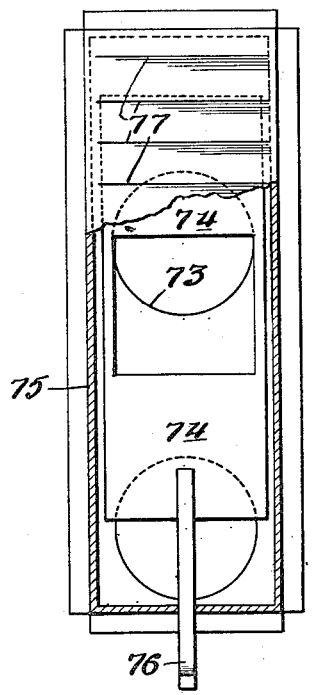
Fig. 10 is a part plan view and part horizontal section through the adjustable ventilator.

As shown in Figs. 3 and 10, a ventilator opening 72 in the top 12 communicates with two passages 73, circular in cross section. A slidable closure 74 consisting of a flat plate, with an opening therein to register with one of the passages 73, is operable by a handle 76 (Figs. 1 and 10) to adjust the ventilator opening. The closure 74 is guided in a casing 75 and the top of this casing is formed with a multiplicity of louver openings 77. To control the motor 20, a suitable electric switch 78 is provided.

The heating units or elements 63 are, as will be apparent from the drawings, arranged to direct their heat rays toward the center skewer 61 or shaft 49 and are so vertically located that food articles carried both by the series of holders 42 and the center skewer 61 will be in the zone of direct radiation from the heating elements.

*Operation*

In operation the motor 20 drives the shaft 21 through the speed reducing gears in casing 22 at a suitably low speed. Individual portions of meat or other foods are placed on skewers or in the holders 41 and secured thereby in the axial sockets 40 in the rollers 43, or in the sockets 60 of the upper ring 59. With the burners 63 in operation the portions of food are carried through heat zones of various temperatures and those portions carried by the lower ring conveyer 36 are constantly rotated about vertical axes as well as traversed around the horizontal, circular track 43. Rotary movement is transmitted from the central, vertical shaft 25 to the head 28 carrying the arms 29 and the outer ends of said arms engage the pins 31 to rotate the ring 30. This ring frictionally rotates the rollers 34 by engagement with the upper conical portions 35 thereof. Rotation of the rollers 34 causes the ring 36 to be rotated by the frictional track 43. I insure continuous rotation of all of the rollers by providing the limited axial movement of each roller in its bearing in the flanges 36 and 37 so that it finds its seat on the track 43 independently of the other rollers and irrespective of particles of food which may lodge on the track 43 or of any slight imperfections in the parts of the mechanism caused by the heat or in the manufacturing operation. Thus each of the holders 41 is rotated about its vertical axis while the ring 36 carrying all of the holders is traversed around the track 43.

Where the upper ring 59 is used this is rotated by the shaft 49 in axial continuation of the shaft 25 and the individual portions of food carried by the holders on this upper ring are moved in the upper portion of the chamber where the heat is less intense and where rotation of the individual portions is unnecessary. In preparing certain dishes, such as the Asiatic revettes, individual portions of meat are first placed in the holders or skewers on the upper ring 59 for a sufficient period to give the desired preliminary heat treatment and then the portions are removed from the machine, immersed in a batter and then placed for a final broiling period in the lower conveyor ring 36.

When the upper ring 59 is not required, this ring, the shaft 49, bracket 52 and arms 53 and 54 are removed from the heating chamber. The large skewers 61 may be mounted centrally, in place of the shaft 49, to hold a large roast. Such roast may be broiled while revolving on the head 28 and individual portions of food may be simultaneously broiled on the revolving supports carried by the ring 36. The intensity of the heat in the chamber may be controlled by suitable operation of the ventilator handle 76 as well as by the gas cocks 66. Obviously electric or other suitable types of heating units may be substituted for the gas burners described herein.

The entire operation is readily visible through the windows 16 and door 15. This aids in the vending as it affords an attractive display.

Important features of my machine are its simplicity and the construction whereby all of the power driven parts and track 43 may be quickly and easily removed from the cooking chamber and separated into readily accessible members for cleaning. The roller friction drive for the individual portions of food also promotes sanitation and continued efficient operation by reason of the fact that it is simple and easy to keep clean and in working order.

Now assuming that a large roast, for example, has been impaled upon the center holder 61 and a plurality of smaller food articles such as fowl or "revettes," for example, are individually supported by the holders 42 of the outer annular series thereof, it will be evident that some of the heat rays directed toward the food on the center holder or skewer 61 will be intercepted by the food particles carried by the food holders 42, which latter will cause shadows upon the centrally located food as earlier described. As made apparent before, however, all detrimental effects of these shadows will be overcome by the relative rotation between the conveyer ring 59 and the center skewer 61. By reference to the drawings, it will be evident that while the conveyer ring 59 will rotate in the same direction as the skewer 61 or the shaft 49, the said conveyer ring will rotate at a reduced speed with respect to the center skewer and by virtue of the differences in circumference between the annular roller engaging surface of the drive ring 30 and track 43.

Having described my invention, what I claim as new and desire to protect by Letters Patent is:

1. In a machine of the class described, a cooking chamber, spaced heating units mounted in circumferentially spaced relation within said chamber and directing heat rays toward the center thereof, a relatively fixed substantially horizontal annular track disposed inwardly of said spaced heating units, a carrier ring having a circumferentially spaced series of roller-like drive elements revolvably mounted thereon with their axes vertical and their outer peripheral portions in operative engagement with said track, a plurality of vertically disposed food supports each carried by and projecting from one of said roller-like drive elements, an annular drive ring in driving engagement with the inner peripheral portions of said series of drive elements and operative under rotation to cause said drive elements to roll around the fixed track and move the food supports carried thereby past the spaced heating units while rotating the same on their own axes, vertically disposed power driven means located axially of said track and drive ring, a center food support carried by the power driven means for common rotation therewith and projecting vertically therefrom into the zone of radiation of said spaced heating units, and drive means extending between and operatively engaging said axial drive means and drive ring and driving the latter in common with the former.

2. In a device of the kind described, a rotary conveyer carrying a circumferentially spaced series of food holders arranged concentrically with respect to and radially outward of the axis of the rotary conveyer, an inner rotary food holder located within the circular space defined by the circumferentially spaced series of food holders, means for rotating said rotary conveyer and inner food holder simultaneously but at different speeds, and heating means located outside of said rotary conveyer and arranged to direct heat rays toward said inner food holder.

3. In a device of the kind described, a cooking chamber, a rotary conveyer concentrically arranged with respect to said cooking chamber and carrying a circumferentially spaced series of food holders disposed inward of the inner walls of said chamber and circumferentially of but radially outward of the axis of the rotary conveyer, and an inner rotary food holder located within the circular space defined by the circumferentially spaced series of food holders, means for rotating said rotary conveyer and inner food holder simultaneously but at different speeds, and heating means located adjacent the inner wall of said cooking chamber radially outward of said rotary conveyer and arranged to direct heat rays toward said inner food holder.

4. In a device of the class described, a rotary conveyer, a circumferentially spaced series of food holders journaled on said rotary conveyer in concentric relation with respect to the axis of the rotary conveyer, an inner rotary food holder located within the circular space defined by the circumferentially spaced series of food holders, heating means located radially outward of the circumferentially spaced series of food holders and arranged to direct rays toward said inner food holder, and means for simultaneously rotating said rotary conveyer and inner food holder while at the same time rotating the food holders of said series on their own axes.

5. The structure defined in claim 4 in which said inner food holder is rotated at a different rate of speed than said rotary conveyer.

6. In a device of the kind described, a cooking chamber, a rotary conveyer concentrically arranged with respect to the cooking chamber, a circumferentially spaced series of food holders journaled on the rotary conveyer in concentric relation with respect to the axis of the conveyer, an inner rotary food holder located within the circular space defined by the circumferentially spaced series of food holders, heating means located radially outward of the circumferentially spaced series of food holders and arranged to direct heat rays toward said inner food holders, and means for simultaneously rotating said rotary conveyer and inner food holder while at the same time rotating the food holders of said series thereof on their own axes.

7. The structure defined in claim 6 in which said food holder is rotating at a different rate of speed than said rotary conveyer.

8. In a device of the class described, a vertically disposed power driven shaft, an annular conveyer concentrically arranged with respect to said shaft, a circumferentially spaced series of food supports vertically journaled on said annular conveyer and projecting thereabove, means independent of said shaft for rotatively supporting said conveyer, means for rotatively driving said series of circumferentially spaced food holders on their own axes under rotation of the rotary conveyer, and means for driving said conveyer from said shaft, said last named means including at least one arm radially projecting from said power driven shaft and operatively coupled to said annular rotary conveyer for rotating said conveyer from said shaft.

9. The structure defined in claim 8 in further combination with a center vertically disposed food holder co-axial with said power driven shaft and disposed within the circular space formed by the circumferentially spaced series of food holders.

10. In a device of the kind described, an annular track, an annular conveyer concentric with said annular track, a circumferentially spaced series of planetary drive elements journaled on said annular conveyer and rotatively engaging said annular track, the axes of said planetary drive elements being parallel to the axis of said annular track, an annular driving ring rotatively engaging said planetary drive elements, food holders carried by and projecting axially from said planetary drive elements and common movements therewith, a drive shaft co-axial with said track and ring, and at least one driving arm projecting radially from said shaft and operatively engaging said ring, an inner food holder removably carried by said drive shaft substantially co-axial therewith, said inner food holder being disposed in the plane of the annular series of food holders and the annular space radially between said inner food holder and the annular series of food holders being open, and heating means disposed radially outward of the annular series of food holders in the plane of the several food holders and arranged to direct its rays toward said inner food holders.

11. In a device of the class described, a vertically disposed power driven shaft, an annular conveyer concentrically arranged with respect to said shaft, a circumferentially spaced series of food supports vertically journaled on said annular conveyer and projecting thereabove, means for rotatively supporting said conveyer, and rotatively driving said series of circumferentially spaced food holders on their own axes under rotation of the rotary conveyer, said means including at least one arm radially projecting from said power driven shaft and operatively coupled to said annular rotary conveyer for rotating said conveyer from said shaft, in further combination with a center vertically disposed food holder co-axial with said power driven shaft and disposed within the circular space formed by the circumferentially spaced series of food holders.

12. In a device of the class described, a vertically disposed power driven shaft, an annular conveyer concentrically arranged with respect to said shaft, a circumferentially spaced series of food supports vertically journaled on said annular conveyer and projecting thereabove, means independent of said shaft for rotatively supporting said conveyer, means for rotatively driving said conveyer series of circumferentially spaced food holders on their own axes under rotation of the rotary conveyer, and means for driving said conveyer from said shaft, said last named means including a driving element spanning the radial space between the shaft and rotary conveyer and rotatively anchored to each thereof.

13. The structure defined in claim 12 in further combination with a center vertically disposed food holder co-axial with said power driven shaft and disposed within the circular space formed by the circumferentially spaced series of food holders.

MICHAEL P. SPARTALIS.